Patented Mar. 16, 1937

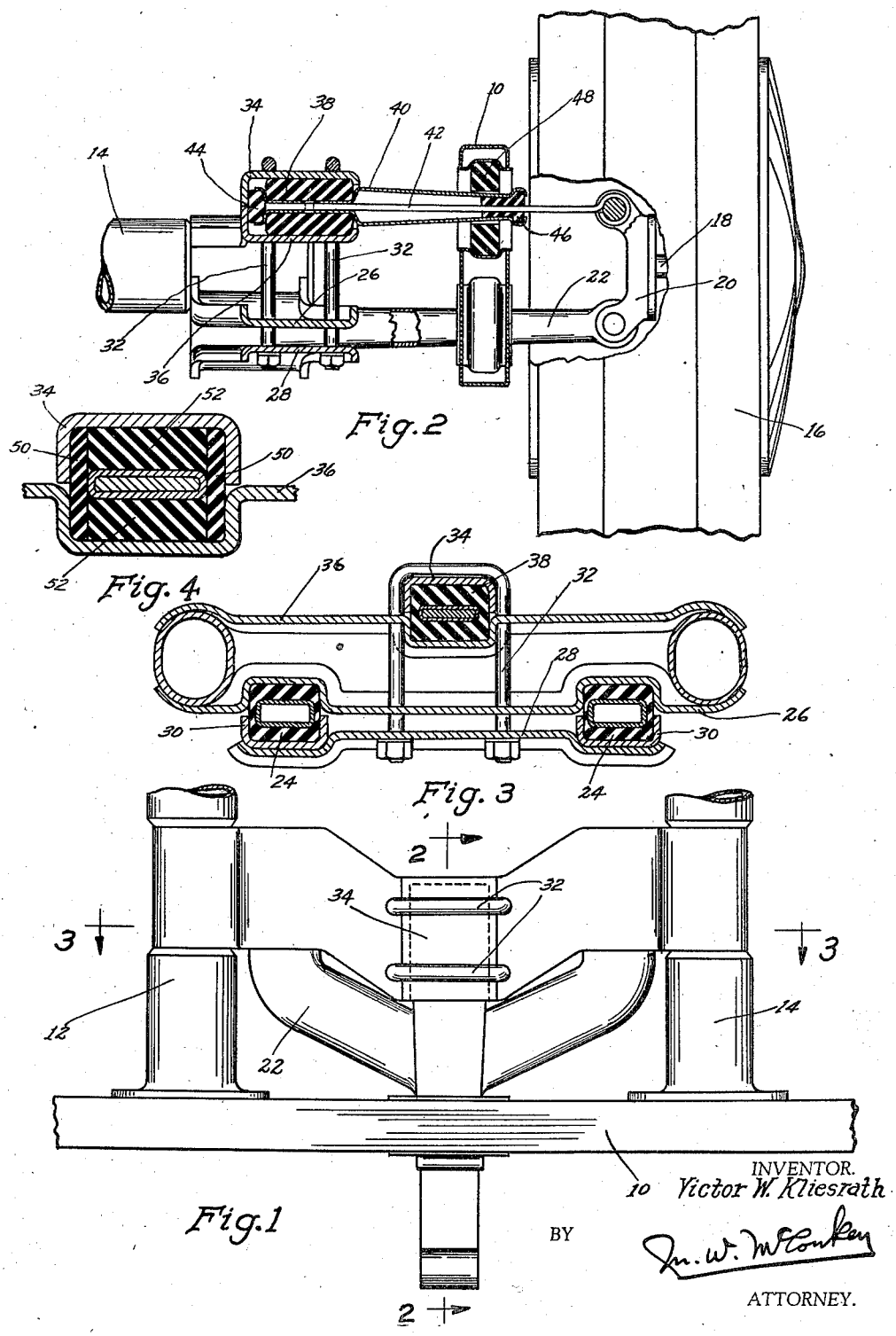

2,073,639

UNITED STATES PATENT OFFICE 2,073,639

SPRING SUSPENSION

Victor W. Kliesrath, South Bend, Ind., assignor to The Steel Wheel Corporation, Chicago, Ill., a corporation of New York Application January 10, 1934, Serial No. 705,989

15 Claims. (Cl. 267—19)

This invention relates to vehicles, and is illustrated as embodied in a novel spring suspension for a vehicle having individually-sprung wheels.

An object of the invention is to provide a device for use in a spring suspension of this character which is very resilient and yet which is not of great length, so that it may be used (for example) as one of the arms of a parallel-arm type of suspension for the wheel.

In one desirable arrangement the device includes a leaf spring member or the like which is pivoted or otherwise connected to the wheel carrier, and which projects from the open end of a tubular arm having an annular rubber block or other resilient means arranged at its open end and embracing the spring member. Preferably the other end of the arm is reduced in size to engage and closely embrace and be secured to the end of the spring member, and if desired it may then be flared or otherwise formed to hold a rubber bumper block or the like in alinement with the end of the spring member.

The reduced end of the tubular arm, with the end of the spring member secured therein, is preferably seated in resilient means shown as a rubber block seated in a socket on a spring bracket or other support. I prefer to make the top and bottom portions of the rubber block relatively resilient, and to make the side portions much harder so that they will resist side sway and other forces acting in directions other than vertical.

The above and other objects and features of the invention, including various novel combinations of parts and desirable particular constructions, will be apparent from the following description of the illustrative embodiment shown in the accompanying drawing, in which:

Figure 1 is a plan view of the spring suspension of one rear wheel and associated parts, with the wheel removed;

Figure 2 is a section vertically there-through, with the wheel in place but broken away to show its mounting;

Figure 3 is a longitudinal vertical section therethrough on the line 3—3 of Figure 1; and Figure 4 is a detail section corresponding to part of Figure 3 but on a somewhat larger scale and showing a different arrangement.

In the arrangement illustrated, one of the side chassis members is shown at 10 and two parallel tubular transverse reinforcing members are shown at 12 and 14. One of the rear wheels 16 is journaled in any desired manner on a spindle 18 carried by a knuckle 20. The lower end of the knuckle 20 is pivoted to the outer end of a Y-shaped axle section or arm 22, of tubular formation made by welding together face to face two channel-section stampings.

The inner ends of the two arms, into which the axle section 22 branches out, are received in sleeves or blocks 24 of rubber or the like resilient material. These blocks are held in seats or sockets in a bracket 26 bridging across and engaging the lower faces of the transverse reinforcing members 12 and 14, by means such as a clamp member 28 engaging caps 30 at its ends. The caps 30 and the seats in bracket 26 form sockets holding and supporting the rubber blocks 24.

Member 28 is shown as a resilient steel stamping, tensioned upwardly by means such as a pair of U-bolts 32. These bolts encircle and urge resiliently downward a cap 34, which cooperates with a seat in an upper bracket 36 engaging the tops of members 12 and 14 to form a socket for a third block 38 of rubber or the like.

The resilient block 38 embraces the reduced end of a novel tubular sleeve 40 which has mounted therein a leaf spring or the equivalent 42 pivoted at its outer end to the upper end of the knuckle 20. Within the block 38, the sleeve 40 closely embraces, and may be riveted or otherwise secured to, the base of the spring 42. The end of the sleeve 40 may be formed as a socket for a small auxiliary block 44 of rubber yieldingly resisting lengthwise movement of the sleeve to the left.

Beyond the block 38, the sleeve 40 is enlarged so that it does not directly restrict the deflections of spring 42. At the end of the sleeve 40, however, is arranged a rubber bushing 46, of softer rubber than block 38, seated in the end of the sleeve 40 and embracing the spring 42.

The side frame member 10 is shown formed with an opening for the passage of the sleeve 40, and within which is arranged an annular rubber bumper block 48, of rubber preferably somewhat harder than block 38.

In order to reduce side sway, as shown in Figure 4 instead of making the above-described blocks of the same rubber throughout, the sides or vertical portions 50 may be made of much harder and denser material than the top and bottom portions 52, although the whole may still be cemented or otherwise formed into a one-piece block.

While one illustrative embodiment has been described in detail, it is not my intention to limit the scope of the invention to that particular embodiment, or otherwise than by the terms of the appended claims. Generally similar spring suspensions, but without the tube 40 or its equivalent, are described and claimed in my prior applications Nos. 651,821, filed January 14, 1933, 651,822, filed January 14, 1933, 679,473, filed July 8, 1933, 697,280 filed November 9, 1933, and 702,140 filed December 13, 1933. It is not my intention to claim herein any of the subject-matter of said prior applications.

I claim:

1. A vehicle spring suspension comprising parallel pivoted wheel-carrying devices, at least one of which includes a tubular arm yieldingly mounted at one end and a spring member arranged therein and secured to said end and having yielding means spacing it from the mouth of said tubular arm and which projects from said arm to form a part of the wheel-carrying devices.

2. A vehicle spring suspension comprising parallel pivoted wheel-carrying devices, at least one of which includes a tubular arm yieldingly mounted at one end and a spring member arranged therein and secured to said end and having an annular resilient block embracing the spring member and seated in the open other end of the tubular arm and spacing said member from the mouth of the tubular arm, said spring member projecting from said arm to form a part of the wheel-carrying devices.

3. A vehicle spring suspension comprising a tubular arm yieldingly mounted at one end and a spring member arranged therein and secured to said end and having yielding means spacing it from the mouth of said tubular arm and which projects from said arm, and wheel-carrying means secured to said member.

4. A vehicle spring suspension comprising a tubular arm yieldingly mounted at one end and a spring member arranged therein and secured to said end and having a resilient block embracing the spring member and seated in the open other end of the tubular arm and spacing said member from the mouth of the tubular arm, said spring member projecting from said arm, and wheel-carrying means secured to said member.

5. A spring suspension device comprising a spring leaf member, a tubular arm within which said member is arranged and which is reduced at one end and there closely embraces and is secured to one end of said member and which surrounds the spring member in spaced relation for the remainder of its length with said member projecting from its open other end, resilient means carried by the arm at said open end and engaging the spring member, and a resilient seat for the reduced end of said arm.

6. A spring suspension device comprising a spring leaf member, a tubular arm within which said member is arranged and which is reduced at one end and there closely embraces and is secured to one end of said member and which surrounds the spring member in spaced relation for the remainder of its length with said member projecting from its open other end, a rubber block carried by the arm at said open end and embracing the spring member, and a resilient seat for the reduced end of said arm.

7. A spring suspension device comprising a spring leaf member, a tubular arm within which said member is arranged and which is reduced at one end and there closely embraces and is secured to one end of said member and which surrounds the spring member in spaced relation for the remainder of its length with said member projecting from its open other end, a rubber block carried by the arm at said open end and embracing the spring member, and a seat for one end of the device including a rubber block embracing the reduced end of said arm.

8. A spring suspension device comprising a spring leaf member, a tubular arm within which said member is arranged and which is reduced at one end and there closely embraces and is secured to one end of said member and which surrounds the spring member in spaced relation for the remainder of its length with said member projecting from its open other end, and resilient means carried by the arm at said open end and engaging the spring member.

9. A spring suspension device comprising a spring leaf member, a tubular arm within which said member is arranged and which is reduced at one end and there closely embraces and is secured to one end of said member and which surrounds the spring member in spaced relation for the remainder of its length with said member projecting from its open other end, and a rubber block carried by the arm at said open end and embracing the spring member.

10. A spring suspension device comprising a spring leaf member, a tubular arm within which said member is arranged and which is reduced at one end and there closely embraces and is secured to one end of said member and which surrounds the spring member in spaced relation for the remainder of its length with said member projecting from its open other end, and resilient means carried by the arm at said open end and engaging the spring member, said reduced end of the arm being provided with a resilient bumper block in line with the end of the spring member.

11. A spring suspension device comprising a spring leaf member, a tubular arm within which said member is arranged and which is reduced at one end and there closely embraces and is secured to one end of said member and which surrounds the spring member in spaced relation for the remainder of its length with said member projecting from its open other end, and resilient means carried by the arm at said open end and engaging the spring member, said reduced end of the arm being flared to form a seat holding a resilient bumper block in line with the end of the spring member.

12. A spring suspension device having its end resiliently mounted in a support having relatively resilient rubber at the top and bottom of said device and having much harder rubber at the sides of said device.

13. A spring-encircling block of rubber having relatively resilient top and bottom portions and much harder side portions adapted to encircle a leaf spring to support the same against both vertical and horizontal movements.

14. A spring suspension arm of tubular form having one end mounted on a frame and having said end reduced to embrace a member arranged within said arm and having resilient member-embracing means in its other end.

15. In a spring suspension, a short flexible leaf spring yieldingly mounted on a frame member at one end, mounting means for a wheel on the other end, resilient means engaging said leaf spring near said other end whereby it is supported without eliminating its initial softness, and second resilient means limiting the ultimate movements of said spring about said first named yielding mounting.

VICTOR W. KLIESRATH.